United States Patent

Imbert et al.

Patent Number: 6,097,446
Date of Patent: Aug. 1, 2000

[54] DIGITAL TELEVISION SIGNAL FLOW REGULATION

[75] Inventors: Michel Imbert, Voiron; Serge Volmier, Crolles; Xavier Cauchy, Meylan, all of France

[73] Assignee: SGS-Thomson Microelectronics S.A., Gentilly, France

[21] Appl. No.: 08/863,660

[22] Filed: May 27, 1997

[30] Foreign Application Priority Data

May 29, 1996 [FR] France ................................ 96 06830

[51] Int. Cl.⁷ .................. H04N 9/64; H04N 7/01; H04N 5/04
[52] U.S. Cl. .................. 348/715; 348/441; 348/550; 348/718; 348/845.2
[58] Field of Search ..................... 348/550, 714, 348/715, 384, 390, 845, 845.2, 10; 382/232, 233; 455/6.2

[56] References Cited

U.S. PATENT DOCUMENTS

| 4,027,100 | 5/1977 | Ishiguro . | |
| 4,101,939 | 7/1978 | Owen et al. | 348/497 |
| 5,398,072 | 3/1995 | Auld | 348/426 |
| 5,452,010 | 9/1995 | Doornick | 348/497 |
| 5,463,422 | 10/1995 | Simpson et al. | 348/390 |
| 5,473,385 | 12/1995 | Leske . | |
| 5,874,995 | 2/1999 | Naimpally | 348/384 |

FOREIGN PATENT DOCUMENTS

| 2 693 865 | 1/1994 | France | H04L 25/30 |
| 35 43 310 | 6/1987 | Germany | H04N 7/13 |

OTHER PUBLICATIONS

French Search Report from French Patent Application 96 06830, filed May 29, 1996.

Electronics & Communications in Japan, Part I—Communications, vol. 75, No. 2, Feb. 1992, New York US, pp. 11–23, Kinoshita et al., "Synchronization and Multiplexing of HDTV Signals For Transmission in Broadband ISDN".

Primary Examiner—John W. Miller
Attorney, Agent, or Firm—Wolf, Greenfield & Sacks, P.C.; James H. Morris; Theodore E. Galanthay

[57] ABSTRACT

The present invention relates to a method for regulating, in the read mode, memory areas of a circuit for decompressing a video data flow compressed according to an MPEG standard, with respect to the writing rate of the compressed data flow into the memory areas, the decompression circuit issuing a flow of image data at the rate of signals for horizontally and vertically synchronizing the images issued by a circuit for coding according to a color television standard, this method including generating a clock signal having a fixed frequency for reading from the memory areas and for generating the horizontal and vertical synchronization signals, and shifting the occurrence of an edge triggering the vertical synchronization signal based on a signal indicative of the state of a buffer memory associated with the memory areas.

35 Claims, 2 Drawing Sheets

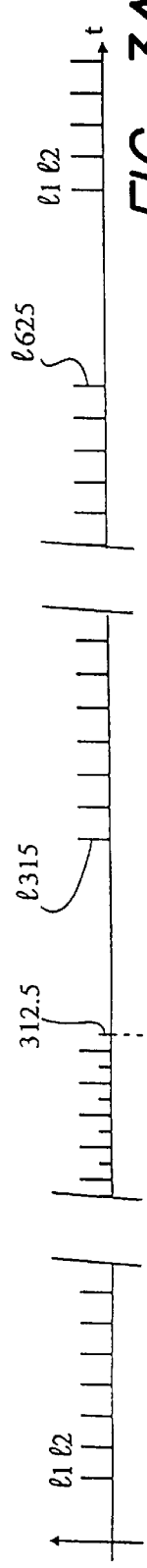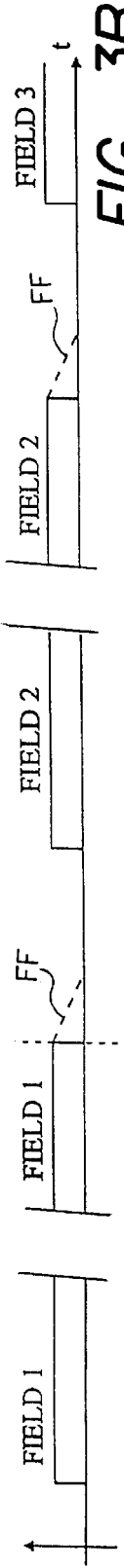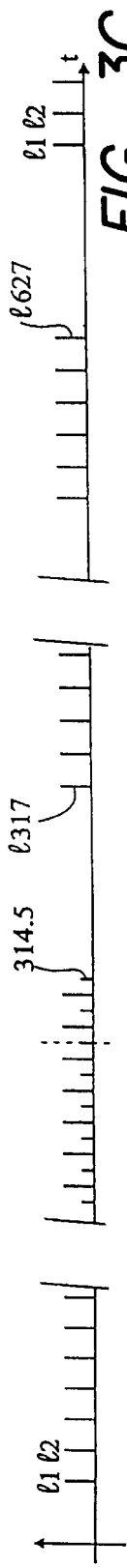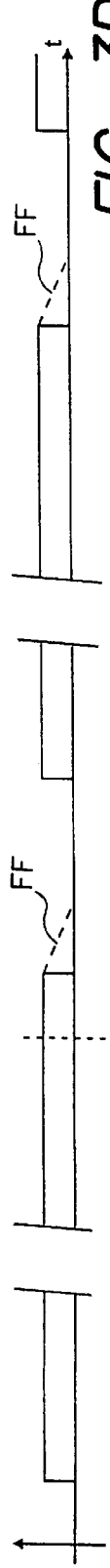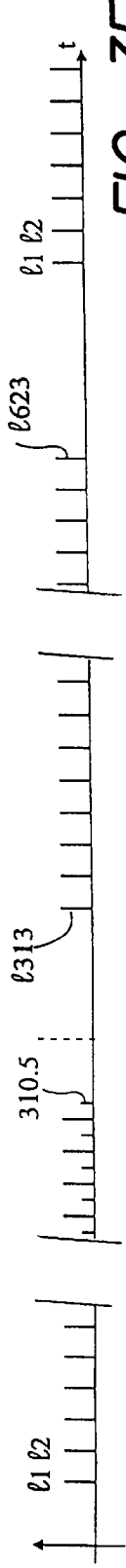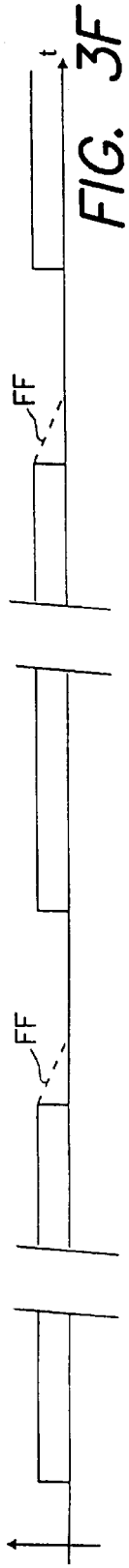
FIG. 3A
FIG. 3B
FIG. 3C
FIG. 3D
FIG. 3E
FIG. 3F

DIGITAL TELEVISION SIGNAL FLOW REGULATION

BACKGROUND OF THE INVENTION

1. Field of the Invention

The present invention relates to converting digital television signals coded according to an MPEG standard into standardized analog video signals (PAL, SECAM or NTSC).

2. Discussion of the Related Art

Television signal sources are more and more frequently digital sources, be it cabled networks, satellite transmissions, video storage digital disks, etc. Such sources require a conversion device for adapting the digital signals to the standardized inputs of a television set which are provided to receive standardized analog signals.

The transmission of digital television signals generally uses data compression, on the transmit side, to limit the amount of data to be transmitted. The information is compressed according to a predetermined standard (MPEG), prior to transmission. This requires that the information be decompressed, on the receive side, by the interface device, prior to converting the digital data flow into an analog data flow.

FIG. 1 shows, in the form of a block diagram, an example of conventional circuit for receiving digital television signals and for converting these signals into analog video signals.

At its input, the circuit shown in FIG. 1 includes a tuner 1 for, in particular, selecting one channel among several channels which are transmitted, for example, by a cabled network (not shown). The digital television signals corresponding to the selected channel are sent to a so-called "acquisition" circuit 2 for, in particular, extracting from the digital data flow a clock frequency corresponding to the transmission rate. Circuit 2 issues the digital television signals to a decompression circuit 3 for decompressing the data coded according to an MPEG standard. Circuit 3 issues a digital flow of images I in their display order to a coding unit 4 for coding flow I according to a PAL, SECAM, or NTSC standard and read out all components of the video signal and, especially, the horizontal and vertical synchronization signals. Unit 4 generally is associated with digital-to-analog converters (not shown) which issue analog video signals, for example, chrominance and luminance signals or a composite video signal.

A problem which arises in such a conversion circuit is the regulation of the video data flow output by unit 4 with respect to the input data flow issued by the transmission channel, in order to enable correct restitution of the images, for example on a television set (not shown).

For this purpose, two phase-locked loop (PLL) clock generators 5 and 6 are generally used. A first generator 5 is meant for generating a clock signal H1 based on the data flow from the transmission channel. This generator 5 generates the clock signal of the system before decompression to recover the received data and control the decompression performed by circuit 3 at the reception rate.

A second generator 6 generates a clock signal H2 for the data after decompression. This clock signal H2 is both used by coding unit 4 and for extracting the data from decompression circuit 3 at the display rate.

Decompression circuit 3 generally includes a field memory 7 which contains half-television images. These images are loaded into the memory at the rate of clock H1, and then are modified by decompression algorithms, and are read at the rate of clock H2 to be transmitted in the form of a flow of images I to unit 4. Two memory areas are generally alternatively used for reading and writing, a first area being written into to store the decoded images while a second area is read from to send the images to unit 4. Memory 7 generally is associated with a so-called "buffer" memory 8 to regulate the data flow when the read and write flows from and into the areas of memory 7 are unbalanced. Memories 7 and 8 are associated with a controller 9, the function of which is to organize the read and write operations from and into the different memories 7 and 8.

Controller 9 monitors the filling rate of buffer memory 8 to control clock H2 for reading from memories 7 and, thus to control the time base (not shown) of unit 4 which generates the synchronization signals included in the video signals and which uses this same clock H2 as a time reference. The horizontal synchronization signals H and vertical synchronization signals V from circuit 4 also are sent to circuit 3 to regulate reading from memory areas 7.

A disadvantage of a conventional circuit, such as shown in FIG. 1, is the necessary use of two clock generation phase-locked loops, which increases the cost of the circuit.

Another disadvantage is that, when the signal of read clock H2 is modified by PLL 6 to regulate the flow, the chrominance subcarrier contained in the composite video signal issued by unit 4 also is modified, since it depends on clock H2 which it uses as a time reference.

SUMMARY OF THE INVENTION

The present invention aims at overcoming the disadvantages of conventional circuits by providing a new system for regulating data flows which makes the clock, used as a time reference for the generation of horizontal and vertical synchronization signals, independent from a possible imbalance between the data flows.

The present invention also aims at providing a regulation system including a single clock phase-locked loop.

To achieve these objects, the present invention provides a method for regulating, in the read mode, memory areas of a circuit for decompressing a video data flow compressed according to an MPEG standard, with respect to the writing rate of the compressed data flow into the memory areas, the decompression circuit issuing a flow of image data at the rate of signals for horizontally and vertically synchronizing the images issued by a circuit for coding according to a color television standard, this method including generating a clock signal having a fixed frequency for reading from the memory areas and for generating the horizontal and vertical synchronization signals, and shifting the occurrence of an edge triggering the vertical synchronization signal based on a signal indicative of the state of a buffer memory associated with the memory areas.

According to an embodiment of the present invention, the shifting corresponds to an even multiple of the period of the horizontal synchronization signal.

According to an embodiment of the present invention, the shifting corresponds to two periods of the horizontal synchronization signal.

According to an embodiment of the present invention, the regulation method includes delaying the vertical synchronization signal when the signal indicative of the state of the buffer memory indicates that this memory is empty, and advancing the vertical synchronization signal when the signal indicative of the state of the buffer memory indicates that this memory is full.

The present invention also relates to a circuit for converting digital television signals compressed according to an MPEG standard into analog standardized video signals (PAL, SECAM, NTSC), including an MPEG decompression circuit receiving a flow of digital data at the rate of a first clock signal controlled by the flow rate of the digital signals and including memory areas alternatively assigned to the read or write mode and associated with a buffer memory, a circuit for coding a flow of digital data issued by the decompression circuit at the rate of horizontal and vertical synchronization signals of a scanning of a television screen, means for generating a second clock signal having a fixed frequency constituting a clock for reading from the memory areas and a reference clock for a generator of the synchronization signals, and means for shifting the occurrence of a vertical synchronization signal based on the state of a signal indicative of the filling rate of the buffer memory.

According to an embodiment of the present invention, the second clock signal is supplied by a quartz oscillator, the nominal frequency of which is the same as that of a quartz used for generating the first clock signal.

According to an embodiment of the present invention, the synchronization signal generator includes means for shifting the occurrence of a vertical synchronization signal by an even number of periods of the horizontal synchronization signal.

According to an embodiment of the present invention, the shifting period of the vertical synchronization signal corresponds to double the period of the horizontal synchronization signal.

These objects, characteristics and advantages as well as others, of the present invention, will be discussed in detail in the following non-limiting description of specific embodiments of the present invention, in relation with the accompanying drawings.

BRIEF DESCRIPTION OF THE DRAWINGS

FIGS. 3A to 3F illustrate the flow regulation method according to the present invention.

DETAILED DESCRIPTION

Figure 1:
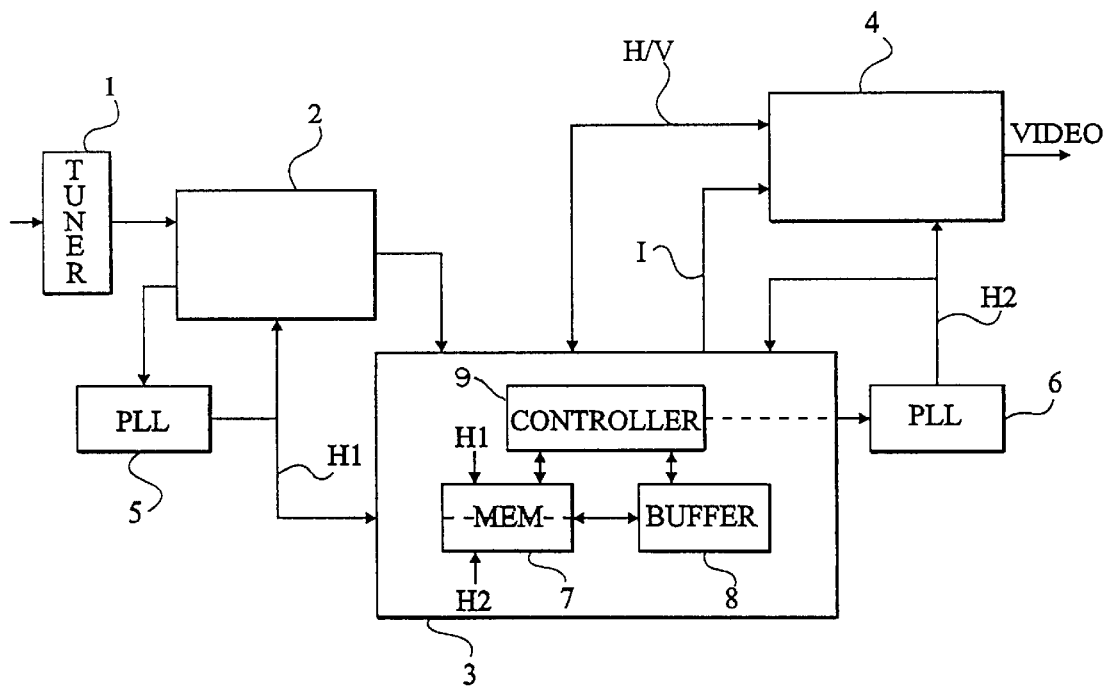
FIG. 1, previously described, is meant to show the state of the art and the problem to solve.

For clarity, the same components have been referred to by the same reference numbers in the different drawings. For clarity still, only the components necessary to understand the present invention have been shown in the drawings.

A characteristic of the present invention is to generate a determined clock signal H2', used as the clock for reading from a memory of a decompression circuit and as a reference clock for the generation of signals for the horizontal and vertical synchronization of analog video signals.

According to the present invention, a circuit for converting digital signals coded according to an MPEG standard into signals coded according to a PAL, SECAM or NTSC color television standard includes, as previously, a tuner, an acquisition circuit, a generator of a first clock signal H1 associated with a phase-locked loop, a circuit 13 for decompressing data coded according to an MPEG standard and a coding circuit 14 issuing standardized video signals. In FIG. 2, only decompression circuit 13 and coding circuit 14 have been shown, the other above-mentioned components being identical to those described in relation with FIG. 1.

According to the present invention, clock generator 6 (FIG. 1), provided with a phase-locked loop, is replaced with an oscillator (OSC) 16 having a determined frequency. Oscillator 16 issues a second clock signal H2', both to decompression circuit 13, to be used as the clock for reading from an area of memory 7, and to coding circuit 14, to be used as a time reference for a horizontal and vertical synchronization signal generator 10.

Figure 2:
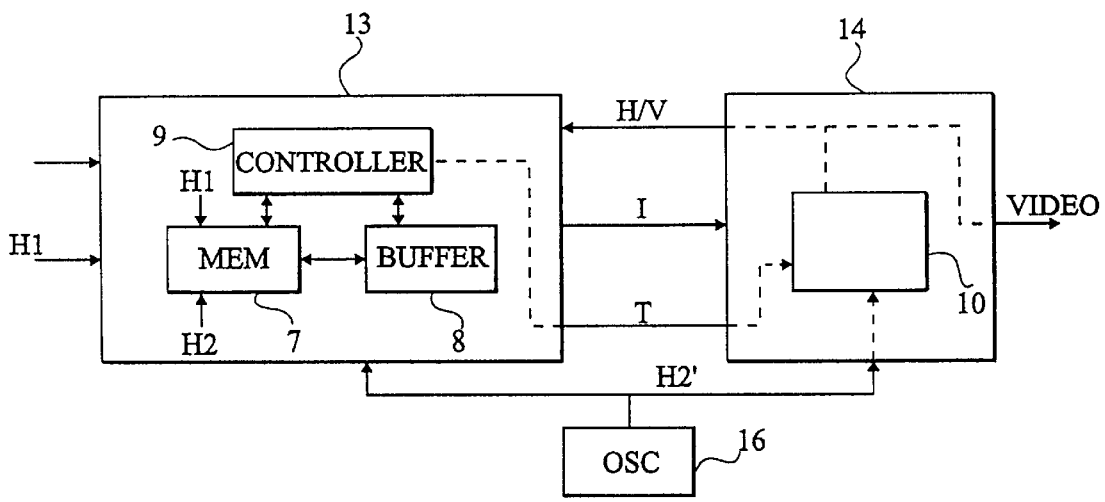
FIG. 2 shows, in the form of a block-diagram, an embodiment of an adaptation circuit according to the present invention.

The operation of decompression circuit 13 is identical to that of circuit 3 described in relation with FIG. 1, except that read clock H2' now is fixed.

As concerns coding circuit 14, the only difference with respect to circuit 4, described in relation with FIG. 1, is horizontal and vertical synchronization signal generator 10.

The operation of the conversion circuit according to the present invention, such as shown in FIG. 2, will be described hereafter in relation with FIGS. 3A to 3F.

FIGS. 3A, 3C, and 3E, respectively 3B, 3D, and 3F, show, in the form of timing diagrams, examples of synchronization signals, respectively horizontal synchronization signals H and vertical synchronization signals V, generated by generator 10 according to the present invention for an operation according to the PAL BG standard.

A characteristic of the present invention is to use a period corresponding to the physical return of the scanning beam, from the last line to the first line, and during which there is no video data in the video signals issued by circuit 14.

This so-called "field flyback" period is triggered by a falling edge of the vertical synchronization signal V, the beginning of the next field (rising edge of signal V) occurring after a fixed and standardized period which follows this falling edge (for example, the equivalent of six line periods).

According to the present invention, this "field flyback" period is used to catch up on possible shifts between the read and write flows from and into areas of memory 7 of decompression circuit 13.

The reading from memory 7 is controlled by the horizontal and vertical synchronization signals generated by circuit 14 and is monitored by clock H2' which generates these synchronization signals. All these signals (H2', H, V) thus are synchronous and circuit 14 behaves as a master circuit with respect to decompression circuit 13 and, especially, with respect to the memory area which is used for reading (output area). Circuit 14 thus controls, at its own rate (imposed by the PAL, SECAM or NTSC coding standard), the video data that it codes and overwrites on the horizontal and vertical synchronization signals to constitute the composite video signal VIDEO which it delivers at this same rate.

As long as buffer memory 8 operates normally, that is, as long as this memory is neither full, nor empty, the falling edge of signal V (FIG. 3B) occurs after a standardized number (312.5 or 625 in PAL and SECAM, 262.5 or 525 in NTSC) of lines (FIG. 3A) which follows a rising edge. The display is performed in an interlaced manner and the times corresponding to the half-lines have been shown by short lines with respect to the edges of signal H. The field flyback FF has been symbolized by dotted lines.

Assuming that clock H2' is faster than clock H1 determined by the flow rate of the transmission channel, buffer memory 8 of circuit 13 will empty after some time.

When buffer memory 8 is empty due to the shifting between clocks H2' and H1, circuit 13 sends a signal T indicative of this state to generator 10. Upon reception of such a signal, generator 10 will delay the rate of the reading from memory 7 by delaying the vertical synchronization signal (FIGS. 3C and 3D). According to the present invention, the occurrence of the falling edge of the vertical synchronization signal is delayed with respect to a standardized field by increasing the number of lines of the field. This shifting must however disturb neither the beam scanning, nor the chrominance signal decoding, the display being performed in an interlaced manner. For this purpose, the edge of the vertical synchronization signal is delayed by a period corresponding to the duration of an even number (for example, two) of scanning lines at the end of the current field, that is, its falling edge occurs at line 314.5 according to the PAL standard (FIG. 3D) or line 264.5 according to the NTSC standard. Thus, for the scanning, the vertical recall of the beam happens 128 $\mu$s later with respect to a standardized field (FIG. 3B).

Thus, two line periods are left to circuit 13 for decompressing data before switching the memory areas from the read to the write mode, and conversely.

Conversely, if the frequency of clock signal H2' is lower than the frequency of clock signal Hi, buffer memory 8 tends to overflow and lines thus have to be suppressed in order to balance the flow. According to the present invention, vertical synchronization signal V thus is advanced by a duration corresponding to two scanning lines by generator 10 when it receives a signal T giving an indication to do so (FIGS. 3E and 3F). The vertical recall of the beam then occurs sooner than for a standardized signal (FIG. 3B).

It should be noted that the shifting occurs in the same manner between two fields of a same image, as shown, or between two fields belonging to two successive images.

It should also be noted that the shifting by two lines provided according to the present invention is by no means disturbing for the image display on the television set. Indeed, color television standards generally provide that the field return is performed outside the visible portion of the image on the television set, the number of scanning lines being considerably higher than the number of lines of this visible portion of the image. The visible portion of the image shows, generally, 580 lines out of 625 according to the PAL and SECAM standards, and 485 lines out of 525 according to the NTSC standard.

It should further be noted that the possible delay (FIG. 3D) of a few lines brought to a field is not perceptible. Indeed, the screen remanence is clearly sufficient since it is higher than the duration of a field in order to enable the interlaced display.

A provided period of two lines is highly sufficient to compensate possible differences between clocks H1 and H2'. Indeed, these two clocks are generated from quartz, the nominal frequencies of which are identical. The possible discrepancies between these frequencies generally are approximately $50.10^{-6}$ PPM (points per million). In the worst case, this amounts to adding or removing two lines every 100 to 120 scanning fields, that is, every 5 to 6 seconds.

The transmission to circuit 14 of signal T indicative of the state of the buffer memory is, for example, performed by a wire communication link or by using a control bus (not shown) common to circuits 13 and 14 and generally provided in any conversion circuit.

According to the present invention, horizontal and vertical synchronization signal generator 10 is modified with respect to a conventional circuit to determine, under control of signal T, the duration of a field. A synchronization signal generator generally includes a synchronous counter based on D flip-flops used as a divider by two. The counter outputs are combined within a decoding block, an output of which triggers the falling edge of signal V. According to the present invention, additional logic combinations are provided to obtain delayed or advanced triggerings of the falling edge of signal V, the selection of the combination used being performed based on signal T.

An advantage of the present invention is that it suppresses the use of control loop 6 (FIG. 1) which includes, in conventional circuits, a voltage-controlled oscillator (VCO), a loop filter, and a signal for controlling the VCO. This control loop is, according to the present invention, replaced with a mere information transfer by bus or wire between decompression circuit 13 and coding circuit 14.

Another advantage of the present invention is that the chrominance subcarrier contained in the composite video signal is generated based on a fixed frequency.

Of course, the present invention is likely to have various alterations, modifications, and improvements which will readily occur to those skilled in the art. In particular, the number of shift lines indicated as an example can be modified according to the frequency variation tolerances of the oscillators used, provided that the number of lines is such that the shifting is always located outside the visible portion of the image on the television set. Further, the practical implementation of the method according to the present invention and the practical implementation of generator 10 are within the abilities of those skilled in the art according to the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for regulating memory areas of a decompression circuit for decompressing a video data flow compressed according to an MPEG standard in a read mode with respect to a writing rate of compressed data into the memory areas, the decompression circuit issuing a flow of image data at a rate of signals for horizontally and vertically synchronizing images issued by a circuit for coding the images according to a color television standard, the method comprising the steps of:

generating a clock signal having a fixed frequency for reading from the memory areas and for generating the horizontal and vertical synchronization signals; and shifting an occurrence of a falling edge of the vertical synchronization signal based on a signal indicative of the state of a buffer memory associated with the memory areas.

2. A regulation method according to claim 1, wherein the step of shifting corresponds to an even multiple of a period of the horizontal synchronization signal.

3. A regulation method according to claim 2, wherein the step of shifting corresponds to two periods of the horizontal synchronization signal.

4. A regulation method according to claim 2, further comprising a step of delaying the falling edge of the vertical synchronization signal when a signal indicative of the state of the buffer memory indicates that the buffer memory is empty, and advancing the falling edge of the vertical synchronization signal when the signal indicative of the state of the buffer memory indicates that the buffer memory is full.

5. A circuit for converting digital television signals compressed according to an MPEG standard into analog standardized video signals, comprising:

an MPEG decompression circuit for receiving a first flow of digital data at a rate of a first clock signal and including memory areas alternatively assigned to a read mode or a write mode and associated with a buffer memory, the rate of the first clock signal being controlled by a flow rate of the digital television signals; and a circuit for coding a second flow of digital data issued by the decompression circuit at the rate of horizontal and vertical synchronization signals of a scanning of a television screen, the circuit for coding including:

means for generating a second clock signal having a fixed frequency, the second clock signal providing a clock for reading from the memory areas and a reference clock for a generator of the synchronization signals; and means for shifting an occurrence of a vertical synchronization signal based on the state of a signal indicative of the filling rate of the buffer memory.

6. A conversion circuit according to claim 5, wherein the second clock signal is supplied by a quartz oscillator, the nominal frequency of which is the same as that of a quartz used for generating the first clock signal.

7. A conversion circuit according to claim 5, wherein the synchronization signal generator includes means for shifting the occurrence of a vertical synchronization signal by an even number of periods of the horizontal synchronization signal.

8. A conversion circuit according to claim 7, wherein the shifting period of the vertical synchronization signal corresponds to double the period of the horizontal synchronization signal.

9. A conversion circuit according to claim 5, wherein the shifting of the vertical synchronization signal occurs during a field fly-back period.

10. An apparatus for converting MPEG compressed digital television signals into standardized video signals, comprising:

an MPEG decompression circuit to receive a first flow of digital data at a rate of a first clock signal, the decompression circuit including a buffer memory and memory areas alternatively assigned to a read mode or a write mode that are associated with the buffer memory, the first clock signal being controlled by a flow rate of the digital television signals; and a circuit for coding a second flow of digital data issued by the decompression circuit at a rate of horizontal and vertical synchronization signals of a scanning of a television screen, including:

a second clock having a fixed frequency that generates a second clock signal for controlling generation of the horizontal and vertical synchronization signals; and a signal generator responsive to the second clock signal that generates the horizontal and vertical synchronization signals and shifts the vertical synchronization signal based on a filling rate the buffer memory without altering the horizontal synchronization signal.

11. The apparatus of claim 10, wherein the first clock signal and the second clock signal each have a frequency, and wherein the frequency of the second clock signal is substantially similar to the frequency of the first clock signal.

12. The apparatus of claim 10, wherein the second clock signal is synchronous with the horizontal synchronization signal.

13. The apparatus of claim 10, wherein the signal generator receives a signal from the decompression circuit having a state that is indicative of the filling rate of the buffer memory and shifts the vertical synchronization signal based upon the state of the signal without altering the horizontal synchronization signal.

14. The apparatus of claim 10, wherein the coding circuit temporally shifts the vertical synchronization signal an even multiple of a period of the horizontal synchronization signal.

15. The apparatus of claim 14, wherein the coding circuit temporally shifts the vertical synchronization signal two periods of the horizontal synchronization signal.

16. The apparatus of claim 10, wherein the signal generator shifts the vertical synchronization signal during a field fly-back period.

17. The apparatus of claim 10 further comprising:

a tuner that selects a channel from among a plurality of channels;

an acquisition circuit that extracts from the digital television signals a frequency corresponding to the flow rate of the digital television signals; and a first clock signal generator for generating the first clock signal based on the flow rate of the digital television signals, the first clock signal generator being associated with a phase-locked loop;

wherein the second clock signal is synchronous with the vertical synchronization signal and the horizontal synchronization signal.

18. A coding circuit for coding video data received from a decompression circuit having a memory and a memory buffer, the coding circuit comprising:

a synchronization signal generator that generates synchronization signals, the synchronization signals controlling a rate at which data is read from the memory in the decompression circuit;

a first input to receive signal pulses from an external clock having a fixed frequency;

a second input to receive a digital flow of images from the decompression circuit; and a third input to receive a signal indicative of a state fullness of the memory buffer from the decompression circuit.

19. The coding circuit of claim 18, wherein the synchronization signal generator generates a horizontal synchronization signal.

20. The coding circuit of claim 18, wherein the synchronization signal generator generates a vertical synchronization signal.

21. The coding circuit of claim 18, wherein the synchronization signal generator includes means, responsive to the signal indicative of the state of fullness of the memory buffer, for shifting an edge of only one of the synchronization signals.

22. The coding circuit of claim 21, wherein the means for shifting shifts an edge of a vertical synchronization signal.

23. The coding circuit of claim 22, wherein the means for shifting shifts the vertical synchronization signal during a field fly-back period.

24. The coding circuit of claim 18, wherein the synchronization signal generator generates both a horizontal synchronization signal and a vertical synchronization signal.

25. The coding circuit of claim 24, wherein the synchronization signal generator further includes means for overwriting on the synchronization signals the analog video signal.

26. The coding circuit of claim 18, wherein the synchronization signal generator includes means for converting the digital flow of images into an analog video signal.

27. A method of converting decompressed digital MPEG video data into a standardized video signal comprising the steps of:
   (a) generating a clock having a fixed frequency
   (b) receiving the decompressed digital MPEG video data at a rate controlled by the clock;
   (c) generating a horizontal synchronization signal and a vertical synchronization signal based upon the clock;
   (d) receiving a signal indicative of a state of fullness of a memory of a decompression circuit; and
   (e) shifting, responsive to the step of receiving the signal indicative of the state of fullness of the memory of the decompression circuit, a falling edge of the vertical synchronization signal.

28. The method according to claim 27, further comprising a step of:
   providing the synchronization signals to the decompression circuit to affect a mode of the memory located in the decompression circuit.

29. The method of claim 27, wherein the step of shifting includes a step of shifting a falling edge of the vertical synchronization signal by an even multiple of a period of the horizontal synchronization signal.

30. The method of claim 29, wherein the step of shifting includes a step of advancing the falling edge of the vertical synchronization signal when the signal indicative of the state of fullness of the memory indicates the memory is full.

31. The method of claim 29, wherein the step of shifting includes a step of delaying the falling edge of the vertical synchronization signal when the signal indicative of the state of fullness of the memory indicates the memory is empty.

32. The method of claim 27, wherein the step of shifting includes a step of shifting a falling edge of the vertical synchronization signal by two periods of the horizontal synchronization signal.

33. The method of claim 27, wherein the step of shifting includes a step of shifting at least one of the synchronization signals during a field fly-back period.

34. The method of claim 27, further comprising the steps of:
   (f) converting the decompressed digital MPEG video data into analog data; and
   (g) overwriting on the synchronization signals the analog data.

35. The method of claim 27, wherein the step of shifting does not modify a chrominance subcarrier contained in the standardized video signal.

* * * * *